Patented May 13, 1941

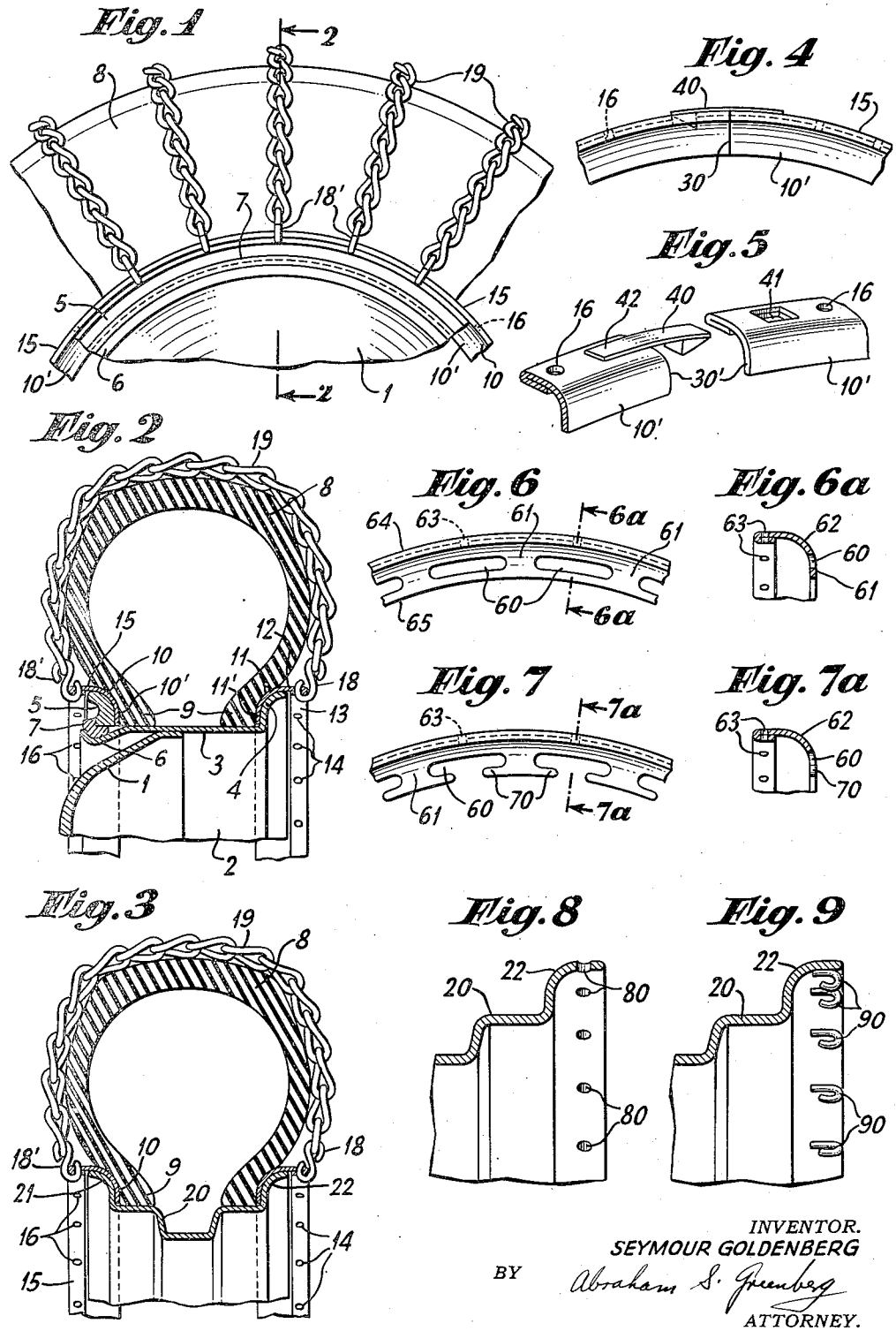

2,241,592

UNITED STATES PATENT OFFICE 2,241,592

ANTISKID CHAIN ANCHOR DEVICE

Seymour Goldenberg, Grantwood, N. J.

Application January 31, 1940, Serial No. 316,463

5 Claims. (Cl. 152—233)

My present invention relates to tire chain anchor devices, and particularly to antiskid chain anchor devices of the type wherein a plurality of chain retaining openings are provided around the entire tire wheel rim flange periphery.

One of the main objects of my present invention is to provide a highly improved type of annular tire chain anchor device, the latter being constructed and arranged to be maintained in position solely by air pressure within the inner tube.

Another important object of my invention is to provide an annular tire chain device which is provided with spaced openings completely around the periphery thereof, the openings being adapted to receive chain terminals and being provided in such a manner that there is no possibility of frictional contact between the chain terminals and the tire shoe surface.

Another important object of my invention is to provide an annular chain anchor device for an automobile tire wheel, and the anchor device having a portion adapted to be clamped in immobile position between the tire rim flange and the tire bead by the inner tube air pressure, and the anchor device having a second portion provided with spaced openings around its entire periphery to receive chain terminals.

Another object of this invention is to provide an anti-skid chain retaining device, the latter having the shape of a ring and being constructed so as to be readily inserted and retained between the rim and tire bead of automobile tires of passenger and truck vehicles.

Still another object of my invention is to provide chain terminal retaining apertures, or other means, in spaced relation around the entire tire rim flange periphery of an automobile wheel.

Other objects of this invention are to improve generally the flexibility and efficiency of antiskid tire chain anchoring devices, and more especially to provide annular anchor devices which are economically manufactured and easily installed on automotive vehicle wheels.

The novel features which I believe to be characteristic of my invention are set forth in particularity in the appended claims; the invention itself, however, as to both its construction and method of use will best be understood by reference to the following description taken in connection with the drawing in which I have indicated diagrammatically several constructions whereby my invention may be carried into effect.

In the drawing—

Fig. 1 shows a portion of an automobile truck wheel embodying the invention,

Fig. 2 is a sectional view along line 2—2 of Fig. 1 looking in the direction of the arrows, but with certain chains removed, Fig. 3 shows a sectional view of a standard passenger automobile tire and rim employing the annular ring anchor device of Fig. 1, but being split, Fig. 4 is a detail front view of the split portion of the annular ring anchor device, to be used on a passenger car, showing the securing device therefor, Fig. 5 is a rear view in perspective of the portion in Fig. 4, Fig. 6 is a modified form of annular anchor ring, Fig. 6a is a sectional view taken along line 6—6 of Fig. 6 looking in the direction of the arrows, Fig. 7 is another modification of the annular anchor ring, Fig. 7a is a sectional view along line 7—7 looking in the direction of the arrows, Fig. 8 is a half-section view of a tire rim similar to that of Fig. 3 and showing the provision of chain receiving apertures in the rim flange, Fig. 9 is a modification of the rim arrangement of Fig. 8 wherein chain retaining hooks are shown secured to the rim flange.

Referring now to the accompanying drawing, wherein like reference characters in the different figures designate similar elements, in Figs. 1 and 2 there is shown a motor truck wheel of the metal disc type. Only a portion of the wheel is shown to preserve simplicity of disclosure, since the remainder of the wheel is merely a repetition of the portion shown. As is well known to those skilled in the truck wheel art, the modern disc wheel generally comprises a hollow dish-shaped member 1 which is welded at its periphery to the inner face of the rim 2. The tire rim itself is made up of two sections. One section consists of the flat, tire bead supporting portion 3 provided with the usual outwardly curved flange 4. The latter is the inner rim flange, since it faces towards the interior of the vehicle. The second section of the rim is the outer rim flange 5 which generally has the configuration of flange 4, but is thicker than the latter. Fig. 2 shows the relative shapes and thicknesses of flanges 4 and 5. The rim portion 3 is provided with a shallow channel 6 at its outer edge, and a wedge-shaped retaining ring 7 is fitted into the shallow channel 6 to retain flange 5 in immobile position on the rim portion 3. As shown in Fig. 2, the wedge-shaped ring 7 is provided with a shoulder against which the lower, outer edge of flange 5 bears. When assembled elements 3, 4 and 5 provide a tire rim with usual vertical flanges. As is well known, the tire shoe 8 has its beads 9 positioned between the rim flanges; the inflated inner tube of the tire is omitted from Fig. 2 since its construction and function are well known.

To assemble a truck wheel of this type, the tire with its inner tube in place is slipped endwise along the face of rim portion 3 towards flange 4 until the inside bead contacts the flange. The outside flange ring 5 is now positioned above the channel 6 and abutting the outside bead. The wedge-shaped retaining ring 7 is then forced into the channel 6, and it securely locks the flange 5 to the rim portion 3. Of course, sufficient air pressure has been introduced into the inner tube to provide outwardly-directed pressure against flange 5. The usual air pressure is then built up in the tire. To remove the tire, the air pressure is reduced sufficiently to permit the ring 7 to be pried out of locking position and removed from channel 6. The flange 5 is then slipped off the rim portion 3, and the tire may now be pulled off the latter.

My invention consists in providing a pair of annular ring members to be located between the rim flanges and the tire beads. The function of these ring members is to act as an anchorage for anti-skid chains adapted to be fitted across the tire tread surface. Thus, between flange 5 and its adjacent tire bead 9 is provided an annular anchor member 10, while the mate of the latter, or annular anchor member 11, is located between flange 4 and its adjacent tire bead 9. Each of the anchor rings consists of a vertical, flat section which is convexly bent to extend beyond the edge of each rim flange.

Referring specifically to Fig. 2, and directly to anchor ring 11, the latter has its vertical, flat section 11' sandwiched between the inner face of flange 4 and the outer face of bead 9. It will be noted that the section 11' is bent to assume the outwardly curved contour of the flange 4. The extensive section of the anchor ring 11 is designated by numeral 12, and it is a flat, horizontal section which is bent under upon itself to provide a reinforced edge 13. The doubled, reinforced edge 13 is provided with equally spaced openings 14 around its entire circumference. These openings, which are adapted to receive the terminal retaining hook of an anti-skid chain, are preferably spaced around the circumference of section 13 at intervals of about 1 to 2 inches. The ring 11 itself may be fabricated from stainless steel, and is of approximately ⅛ inch stock. Usually the thickness of ring 11 will be of the order of half the thickness of flange 11. The opposite anchor ring 10 consists similarly of a vertical, flat section 10' sandwiched between the inner face of flange 5 and the outer face of its adjacent tire bead 9. The section 10' bends outwardly in a convex manner, as in the case of ring 11; the extensive section 15 of the ring is folded under itself for reinforcement. The reinforced edge 15 is provided with spaced openings 16, as in the case of the openings 14.

Both anchor rings may be made of cold rolled steel, as well as of stainless steel stock. By using ⅛ inch stock, and providing the convex curvature between the gripped, or clamped, section and the reinforced edge the anchor ring has increased rigidity and strength imparted to it. Each of the sections 12 and 15 of the anchor rings extend sufficiently beyond the rim flanges to prevent the chain terminal hooks from rubbing against the shoe face adjacent thereto.

To operatively position the anchor members, the flange 5 and tire shoe are removed. The anchor ring 11 is then slid over the rim portion 3 towards the inner face of flange 4 until the ring 11 and flange are in contact. The tire shoe and its inner tube are then slid into position with the outer face of bead 9 in contact with the inner face of ring member 11. It will be understood that the inner tube is sufficiently deflated. The next step in the assembly is to mount the annular member 10 on the rim portion 3 with the inner face of member 10 in contact with the outer bead surface adjacent thereto. It is now only necessary to position the flange ring 5 as shown in Fig. 2, and then force the retaining ring 7 into the channel 6. When the tire is now inflated to normal operating pressure, the anchor rings 10 and 11 will be held immobile by a normal component of pressure directed at right angles to the plane of the vertical sections 10' and 11', as well as by a downward component of pressure directed against the curved portions of the anchor rings. It is only necessary now to attach the anti-skid chains to the anchor rings. As shown in Fig. 2 this is done by securing one of the terminal hooks 18 of a chain 19 to the reinforced edge 13 by slipping the hook through an opening 14. The opposite hook 18' is secured to the reinforced edge 15 by slipping the hook through one of the openings 16. In Fig. 1 is shown a plurality of hooks secured in spaced relation along the anchor rings. It is to be understood that a slight degree of slack will be usually desirable in each chain 19. Obviously the anchor members may be aligned so as to have openings 14 and 16 in correspondence. However, even if these anchor members are assembled so that their respective openings alternate it is perfectly feasible to attach chains between the openings of the ring members since the anti-skid chains may cross the tread at a diagonal and yet be serviceable.

Since in the case of automobile truck wheels of the type using a separable outer rim the anchor ring members may be slid over the rim portion 3, the ring members may be continuous in construction. However, in the case of a tire rim construction where the opposite rim flanges are integral parts of the entire rim, it is necessary to employ split anchor rings. For example, in Fig. 3 there is shown a tire rim 20 of well known construction, and as commonly used for automobiles of the passenger and small truck type. Such a rim is constructed as shown in Fig. 3 and has an outer flange 21 and an inner flange 22. Otherwise the construction is similar to that described in connection with Fig. 2. That is the opposite beads 9 of the tire 8 are mounted in spaced relation against flanges 21 and 22 respectively. Furthermore, the anchor ring members 10 and 11 are clamped in immobile state between each flange and its adjacent tire bead. It will be understood that the anchor ring member 11 is constructed exactly the same as in the case of Fig. 2.

Similarly the anchor member 10 is constructed the same as the member 10 in Fig. 2. The only difference in construction in the anchor ring members is the fact that each of rings 11 and 10 will be split where the type of rim shown in Fig. 3 is used. This is necessitated by the fact that it is necessary to work each ring member over the rim flange in order to position the vertical section of each ring member in position between a flange and the adjacent tire bead. In other words, in order to position the anchor rings 10 and 11 it is only necessary to deflate the inner tube sufficiently to permit the vertical section of each ring to be forced in between the tire bead and flange, and this is done by pulling the split ends of each anchor ring apart and then working in the vertical section from one split end to the other end. When both rings are in position it is merely necessary to inflate the inner tube to its normal operating pressure. When this is done it will be found that these anchor members are positively locked in position by the afore-described components of air pressure. It is also to be noted that any forces tending to pull the ring members towards the ground simultaneously pulls the upper portion of the ring members against the base of the rim with the result that there is provided an additional tendency to keep the anchor members in clamped position.

The ring members may be split at any point in the circumference. However, wherever the split occurs, and as shown in Figs. 4 and 5, there is provided a biased latch device to permit the split ends to be brought together should they be spaced by the deformation occurring during the step of working the ring member into clamped position. For example, let it be assumed that there is shown in Figs. 4 and 5 that portion of the ring member 10 on either side of the split section. In that case numeral 30 denotes the split portion, and numeral 10' designates the vertical section of the ring which is positioned between the tire bead and a flange. The reinforced horizontal section 15 is provided with the openings 16 adapted to receive the chain terminal hooks. Fig. 4 shows the appearance of the split section when the split ends are in contact and the latch device is in normal closed position. This will be the appearance of the ring member when it is in operative clamped position between the inflated tire and the tire rim flange. Fig. 5 shows the appearance of the split section when the split ends are spaced due to the fact that the split ends must be pulled apart in order to work the ring member in operative position. Due to the deformation that occurs in such case, and prior to the inflation of the inner tube, the split ends 30' will be spaced by a small amount. It is only necessary to pull the split ends 30' toward each other until the downwardly biased male latch member 40 rides into the opening 41 provided in the reinforced edge 15. It will be understood that the member 40 may comprise a relatively thin strip of spring steel which may be welded at its end 42 to the flat section 15. It will be obvious that when the leading section of the latch rides into opening 41 it will readily snap into locked position by virtue of its normal downward bias. Of course, the opening 41 may have a circular configuration if desired. It will be found that the split ends 30' may be readily pulled together so that the latch device 40 can hold the split section in the position shown in Fig. 4 until the inner tube is inflated and the air pressure is sufficiently high to lock the ring member and thereby prevent any possible spacing between edges 30'.

In Fig. 6 there is shown a modification of an anchor ring member wherein spaced elongated openings are provided a short distance from the lower edge of the vertical section. Thus the numerals 60 denote the elongated openings which are equi-distantly spaced around the vertical section 61 of the ring member 62. The openings 63 are provided in the horizontal reinforced section 64. It will be noted from Fig. 6a that the cross-sectional configuration in this modification is the same as that in the case of Figs. 2 and 3. In other words, the spaced openings 60 are provided adjacent the lower edge 65 to provide openings through which portions of the tire bead may bulge in order to provide additional means for anchoring the ring member. In other words, under the force of the air pressure directed normal to the opening 60 the portions of the tire bead surface which contact these openings will work into the same and provide a plurality of additional anchorages around the entire circumference of the ring member.

Fig. 7 shows a modification of the openings 60 in Fig. 6. In this case the low portions of the vertical section 61 central of the openings 60 are cut away. This leaves depending inverted T-shaped elements serving as anchorages. It will be noted from the cross-sectional view of Fig. 7a that the contour of the ring member is that of Fig. 6a. In use, and when the inner tube is fully inflated, the portions of the outer surface of the tire beads adjacent the shoulders 70 will bear down against the latter. This occurs since the tire bead will have portions thereof bulging into the spaced openings 60. The action of the openings 60 in the case of Figs. 6 and 7 is very much similar to that disclosed in my co-pending application Serial No. 280,543, filed June 22, 1939.

In Figs. 8 and 9 respectively are shown simplified variations. In Fig. 8 the inside flange 22 of rim 20 is extended beyond normal requirement, and the extended portion is provided with spaced openings 80 around the entire circumference. It will be understood that the opposite flange of the tire rim, which is not shown, is also provided with an extended horizontal portion, and that the latter will have spaced openings corresponding to the openings 80. It is merely necessary to hook the terminals of the chains to the openings 80 of each rim flange. In Fig. 9 it is to be understood that the rim 20 is of normal construction, but that the flanges are provided with a plurality of horizontally disposed hooks 90 which are spot-welded at spaced intervals around the entire circumference of the lower surface of flange 22. In other words, flange 22 in Fig. 9 is constructed like the flange 22 in Fig. 8, and hooks 90 are secured adjacent the edge of the horizontal section of the extended flange. In this form of construction the chain terminals hooks are attached to the hooks 90 of the opposite rim flanges.

It is to be clearly understood that the tire rim construction shown herein may be varied in accordance with the different uses to which the invention may be put. Furthermore, the latch device 40 is merely illustrative. It will also be understood that where the flanges of the rim are of less thickness than a ¼ of an inch that the anchor ring member will then be made sufficiently thin to have a ratio of approximately one-half the thickness of the rim flange.

While I have indicated and described a construction for carrying my invention into effect, it will be apparent to one skilled in the art that my invention is by no means limited to the particular construction shown and described, but that many modifications may be made without departing from the scope of my invention, as set forth in the appended claims.

What I claim is:

1. In an antiskid device for vehicle wheels, the combination with a tire and a tire rim for supporting the latter, annular ring members disposed at opposite sides of the tire, each ring member comprising a section immovably clamped between a tire bead and the adjacent tire rim flange and a chain-retaining section extending beyond the tire rim flange, said last section being bent under upon itself to provide a reinforced edge, and a plurality of spaced openings provided around the circumference of the chain-retaining section of each ring member.

2. In an antiskid device for vehicle wheels, the combination with a tire and a tire rim for supporting the latter, annular ring members disposed at opposite sides of the tire, each ring member comprising a section immovably clamped between a tire bead and the adjacent tire rim flange and a chain-retaining section extending beyond the tire rim flange, said chain-retaining sections being bent convexly relative to the tire rim flanges, and equidistantly spaced holes provided around the circumference of each of said retaining sections to receive detachably the terminals of chains and said holes being aligned in a circle located between the outer edge of said chain-retaining section and the bend line of the ring member.

3. In an antiskid device for vehicle wheels, the combination with a tire and means including a tire rim for supporting the tire, of annular ring members disposed at opposite sides of the tire between each flange of the rim and the tire bead adjacent thereto, and chain elements extending across the tire tread and removably connected to said ring members, each ring member consisting of a section clamped between a tire bead and said flange, and a second section extending beyond the adjacent rim flange, and said first section being provided with openings to provide firm anchorage for the ring member.

4. An antiskid tire chain retaining device comprising an annular ring member having a substantially flat section adapted to be clamped between a tire bead and a tire rim flange, said member having a second section projecting from said flat section, said second section bending convexly relative to the flat section and being bent under upon itself to provide a reinforced edge, and a plurality of equally spaced holes provided around the circumference of the reinforced edge for detachably receiving terminals of chains.

5. An antiskid tire chain retaining device comprising an annular ring member having a substantially flat section adapted to be clamped between a tire bead and a tire rim flange, said member having a second section projecting from said flat section, said second section bending convexly relative to the flat section and having a plurality of means for detachably receiving terminals of chains, said flat section being provided with spaced openings for providing anchorage for the ring member.

SEYMOUR GOLDENBERG.